(12) United States Patent
Wallach et al.

(10) Patent No.: US 11,483,958 B2
(45) Date of Patent: Nov. 1, 2022

(54) INTELLIGENT CROP MAINTENANCE DEVICE WITH INDEPENDENTLY CONTROLLED BLADES

(71) Applicants: Bret Wallach, San Diego, CA (US); Harvey Koselka, Trabuco Canyon, CA (US)

(72) Inventors: Bret Wallach, San Diego, CA (US); Harvey Koselka, Trabuco Canyon, CA (US)

(73) Assignee: VISION ROBOTICS CORPORATION, San Diego, CA (US)

( * ) Notice: Subject to any disclaimer, the term of this patent is extended or adjusted under 35 U.S.C. 154(b) by 584 days.

(21) Appl. No.: 16/520,254

(22) Filed: Jul. 23, 2019

(65) Prior Publication Data

US 2021/0022282 A1 Jan. 28, 2021

(51) Int. Cl.
*G06T 7/73* (2017.01)
*G06V 20/58* (2022.01)
(Continued)

(52) U.S. Cl.
CPC ............ *A01B 63/245* (2013.01); *A01B 31/00* (2013.01); *A01B 63/004* (2013.01);
(Continued)

(58) Field of Classification Search
CPC ... A01B 63/004; A01B 63/008; A01B 63/023; A01B 63/245; A01B 79/005;
(Continued)

(56) References Cited

U.S. PATENT DOCUMENTS

| 4,489,787 A | 12/1984 | Gary .................................. 172/1 |
| 5,527,218 A | 6/1996 | Van den Bossche et al. .. 460/20 |

(Continued)

FOREIGN PATENT DOCUMENTS

WO 2014111387 A1 7/2014 ............ A01B 69/00

OTHER PUBLICATIONS

"The Robovator is a vision based hoeing machine for controlling weed in row crops", F. Paulson Engineering, retrieved from http://www.visionweeding.com/robovator/, dated Feb. 5, 2016.
(Continued)

*Primary Examiner* — Andrew W Johns
(74) *Attorney, Agent, or Firm* — ARC IP Law, PC; Joseph J. Mayo

(57) ABSTRACT

System that automates crop maintenance activities, such as cultivating and weeding, with a device that intelligently and independently controls two blades that drag along either side of a crop row using sensors to repeatedly track the position of the blades and of the plants in the row. Blades may be moved in and out independently using an actuator for each blade to contour closely around the individual plants, even if plants or rows vary in their positions, and even if plant sizes and shapes differ. An illustrative system may use a single camera and a processor per crop row; the processor may analyze camera images to locate plant positions and shapes, to plan blade trajectories, and to control blade actuators. The processor may be able to control blade movement precisely to respond quickly to sensor input on changes in plant positions, shapes, and sizes along the row.

19 Claims, 14 Drawing Sheets

(51) Int. Cl.
   *A01B 63/24* (2006.01)
   *A01B 63/00* (2006.01)
   *A01B 31/00* (2006.01)
   *A01B 69/04* (2006.01)
   *G05D 1/02* (2020.01)
   *A01B 79/00* (2006.01)

(52) U.S. Cl.
   CPC .......... *A01B 69/008* (2013.01); *A01B 79/005* (2013.01); *G05D 1/0246* (2013.01); *G06T 7/73* (2017.01); *G06V 20/58* (2022.01); *G05D 2201/0201* (2013.01); *G06T 2207/30188* (2013.01); *G06T 2207/30204* (2013.01); *G06T 2207/30261* (2013.01)

(58) Field of Classification Search
   CPC ........... G06T 7/0002; G06T 7/70; G06T 7/73; G06T 2207/30188; G06T 2207/30261; G06V 20/58; G06V 20/68
   See application file for complete search history.

(56) References Cited

U.S. PATENT DOCUMENTS

| | | | |
|---|---|---|---|
| 6,182,770 B1 | 2/2001 | Pickett et al. | 172/177 |
| 6,671,582 B1 | 12/2003 | Hanley | 700/245 |
| 8,083,004 B2 | 12/2011 | Knight, Jr. | 172/7 |
| 9,030,549 B2 | 5/2015 | Redden | G06K 9/3241 |
| 9,064,173 B2 | 6/2015 | Redden | G06K 9/3241 |
| 9,717,171 B2 | 8/2017 | Redden et al. | A01B 41/06 |
| 9,756,771 B2 | 9/2017 | Redden | A01B 41/06 |
| 9,891,629 B2 | 2/2018 | Murray et al. | G05D 1/0276 |
| 10,098,273 B2 | 10/2018 | Redden et al. | A01B 79/005 |
| 10,127,450 B2 | 11/2018 | Redden et al. | G06K 9/00657 |
| 10,149,422 B2 | 12/2018 | Tippery et al. | A01B 69/008 |
| 10,165,722 B2 | 1/2019 | Ackerman et al. | A10B 69/008 |
| 10,175,362 B2 | 1/2019 | Redden et al. | G01S 17/89 |
| 10,192,112 B2 | 1/2019 | Redden et al. | G06K 9/00657 |
| 10,206,324 B2 | 2/2019 | Gerrish | A01B 69/008 |
| 10,219,449 B2 | 3/2019 | Redden | A01G 22/00 |
| 10,255,670 B1 | 4/2019 | Wu et al. | G06T 7/0004 |
| 2010/0048269 A1 | 2/2010 | Ricketts et al. | 460/2 |
| 2013/0116894 A1 | 5/2013 | Perez-Iturbe et al. | 701/50 |
| 2014/0230396 A1 | 8/2014 | Dybro et al. | A01D 75/00 |
| 2016/0077075 A1 | 3/2016 | Reich et al. | G01N 33/0098 |
| 2018/0035606 A1 | 2/2018 | Burdoucci | A01D 34/008 |
| 2018/0070531 A1 | 3/2018 | Long et al. | A01D 34/006 |
| 2019/0239502 A1* | 8/2019 | Palomares et al. | A01B 69/008 |
| 2020/0073389 A1* | 3/2020 | Flajolet et al. | G06V 10/82 |

OTHER PUBLICATIONS

"High Speed Electric in-Row Weeding" by Tillett and Hague Technology, youtube video uploaded Sep. 18, 2015, retrieved from https://www.youtube.com/watch?v=912XK-U_6ZE.

"The Steketee Finger weeder" webpage, retrieved from https://www.steketee.com/en/mechanical-weedcontrol/fingerweeder/ (2017).

"Mantis AG Technology" webpage, retrieved from http://mantisagtech.com (2019).

"Lettuce Thinning Goes Automated with New Machines," Precision AG article dated Nov. 15, 2018, retrieved from https://www.precisionag.com/market-watch/lettce-thinning-goes-automated-with-new-machines/.

"Auto Thinner", AG Mechtronix, retrieved from http://www.agmechtronix.com/RCT (2018).

"Guiding Cultivators Offer Cost Savings to Growers, Growing Produce" article dated Jul. 1, 2007, retrieved from https://www.growingproduce.com/vegetables/guiding-cultivators-offer-cost-savings-to-growers/.

International Search Report and Written Opinion issued in PCT/US20/43247, dated Oct. 23, 2020 (7 pages).

International Preliminary Report on Patentability issued in PCT/US2020/43247, dated Feb. 3, 2022 (6 pages).

* cited by examiner

INTELLIGENT CROP MAINTENANCE DEVICE WITH INDEPENDENTLY CONTROLLED BLADES

BACKGROUND OF THE INVENTION

Field of the Invention

One or more embodiments of the invention are related to the field of agricultural equipment. More particularly, but not by way of limitation, one or more embodiments of the invention enable an intelligent crop maintenance device with independently controlled blades.

Description of the Related Art

Crop maintenance includes activities performed between planting and harvesting to manage the condition of the plants and the field. These activities include weeding and cultivating, which have been a part of agriculture for millennia. Initially these activities were manual; a laborer used a rake or a hoe to weed and break up the soil around and near the plant including under the canopy. Some of the manual cultivating process could be replaced by animals (and later, tractors) pulling blades through the ground along rows. This first step of automating the process was limited because the blades could only move in the same direction as the motion of animal and the position relative to the row was limited to how straight it would move. In other words, the blades did not go between the plants in the same row and could not get too close because the animal team or tractor driver did not go in a perfectly straight line. The performance of these cultivators could be augmented by hand labor to clean up close to and between plants if the manual labor was deemed worthwhile (brought in a higher return than it cost). Farmers have always been trying to improve this system.

Using tractors to plant and cultivate created straighter rows than typically made by animals. With this greater precision for both the plant rows and the cultivator, the cultivator blades were moved closer to the plants decreasing the amount of hand labor. Planting on beds and GPS control have enabled further precision enabling blades to be brought still closer to the plant. The Steketee Finger Weeder is an example of a cultivator—weeder that works indiscriminately on a row but is designed to reach as much of the ground as possible without any intelligence. Mechanical based systems have attempted to sweep between the plants with limited success. These systems are based on odometry and essentially work blindly and are not feasible if the plants do not have regular spacing. The mechanical systems are slow and require very large clearance around the plants, lest they accidently damage or kill the plants. These systems are also not used in crops where the plants start to grow close together along the row.

Recently, computers and electronics have enabled a new class of intelligent mechanical weeders and cultivators such as the Robovator® and the Tillet and Hague Technology, Ltd. cultivator. The former uses blades positioned on either side of the row and are pushed in-and-out while the latter uses a rotary cultivation technique where an eccentric blade spins 360 degrees around the plant when the center of the rotation is approximately straight over the plant. These concepts are improvements because they enable the blades to work completely around the plant. These systems also include cameras to identify and determine the relative locations between the plants and the cultivation blades enabling an improvement in positioning and coordination relative to indiscriminate systems. Yet, there are still limitations with the most obvious problem being when the cultivating motion is not perfectly synchronized with the tractor motion and plant location along all three degrees-of-freedom. These positional errors may cause the system to take out a good plant. Despite having vision, the current systems still have high tolerances along the direction of travel, and the lack of precision location side-to-side relative to the plant will likewise cause problems with the blades getting too close to the plants. Hence, even these intelligent weeders require more nominal clearance around the plant than is optimal to account for their imprecision.

The rotary cultivator concept uses an eccentric blade that is quickly rotated 360 degrees around the keeper plant. The blade itself is offset from the centerline of the rotation so when it is positioned to the side, it is outside the plant. When the blade is positioned to the front or back, it plows the row between the plants. The neutral position is in the row line and it rotates as it passes over the plant drawing a spirograph type shape in the ground around the plant. The shape of this pattern is directly based on the blade offset from the centerline, the tractor speed and the rotation speed. The blade offset is set mechanically so the radius of the cut is limited by how the machine is mechanically setup. The length and overlap of the spirograph is determined by the tractor and rotation speed which are independent of the weeding system control. The device cannot inherently control for being off location side-to-sides and the front-to-back shape is also very limited by the mechanical and system configuration.

The dual blade concept utilizes blades mounted on two arms that move in a reciprocating motion on either side of the plant row. A single actuator is used to drive the motion of the two blades. The goal is for the two arms to contour around the plant along the plant row and between the plants where the blades come together. The two blades along the row may be staggered either in length along the row or in depth so they can overlap, but the motions are still mirror images. Like most farm equipment, the blades are hydraulically driven, and the reciprocating motion enables coverage around the plant while minimizing the number of actuators. This requires mechanical stops for both the in and out positions and the speed is determined by the hydraulic flow. In this system, there are three states: (1) Open, the arms are pushed against the outer stops with the blades separated by maximum amount; (2) Closed, the arms are pushed against the inner stops with the blades separated by minimum amount; and (3) Transition, the arms are moving between open and closed at the pre-set hydraulic speed. The hydraulic actuators generally used in these systems are unable to control either the speed of motion or the position of the blades; they simply cycle blades between limit stops at a fixed speed. Although more complex hydraulic controls exist, for example with electronically controlled valves or servo hydraulic controllers, these are not typically used in farming equipment.

Like with the rotary cultivator design, errors in position with the dual blade configuration, both along and perpendicular to the row can cause the blades to kill desired plants. As such, this design also necessitates larger than optimal clearance around the plants to ensure their safety. Even if the system is located perfectly relative to the keeper plant, the cultivator pattern would not be optimal if the plant is not round or at least symmetric or is smaller than the maximum for the setup. For example, if the plant has grown more on one side of the center of the row, the cultivator blades will be closer to the larger side and further from the smaller.

In general, both these designs have four major design limitations: (1) fixed mechanical motion—the blades make the same motion regardless of the size, shape and location of the plant; (2) errors due to positional tolerance along the plant row; (3) errors due to positional tolerance perpendicular to the plant row; and (4) inability to adjust for different plant shapes.

(1) Fixed Mechanical Motion: The cultivator blades make the same repeated mechanical motions between limit stops. Therefore, the blade motion profiles must be set to handle the largest, or worst-case condition. By definition, this is not the optimal contour for the vast majority of plants. Varying tractor ground speed also changes the blade contour pattern in the ground, since the motion of the blades is fixed.

(2) Errors Due to Positional Tolerance Along the Plant Row: Existing intelligent mechanical weeders and cultivators position cameras to look at the plants anywhere from 10-26" or more in front of the implement. The systems then use odometry to calculate when the implement is over the plant. There is typically a calibration required to properly set the timings. This is also standard practice on intelligent spray systems such as spray weeders and spray lettuce thinners such as those made by Blue River Technologies, Mantis, Agmechtronix and Vision Robotics Corporation. While most of these devices use an encoder on a wheel, other technologies such as visual odometry; laser motion sensors, GPS and LASIC sensors have been used with various successes. Regardless of the sensor, the process is for the system to determine when the weeder (or other device) has moved to the position where the actuator is to perform its task. Each sensor has a tolerance or accuracy that is usually a percentage of the distance moved in the few percent range. Using 10%, which is high but simple for illustration, if the blades are 24" behind the cameras, the accuracy of the position would be 2.4". In worst case conditions, the blade will be 2.4" away from the intended position, and the cultivator pattern adjusted appropriately. The grower may want to ensure no damage to plants at the worst case or cheat a little and risk damage to a small number of plants of the accuracy ever reached this tolerance. Regardless, setting a large clearance around all plants or medium clearance around all plants and potentially damaging a few is not ideal.

(2) Errors Due to Positional Tolerance Perpendicular to the Plant Row: Tractor drivers do not necessarily drive accurately and straight when cultivating (weeding) or when forming a bed or planting the seed. The side-to-side inaccuracy causes the same clearance versus damage issues described above. Companies have found ways to address part of the problem by adding a side-shift mechanism to the product. This mechanism is integral to the machine and adds an additional degree of freedom to the implement such that the entire implement is shifted perpendicular to the direction of travel of the tractor. The Vision Robotics, VR Lettuce Thinner is an example of an intelligent, targeting spray system employing this technology, and Eco-Dan is a stand-alone product that may be coupled with a traditional cultivator or other system to keep it centered over the row. While no individual pass is perfectly accurate, most tasks are performed on multiple rows at the same time. For example, lettuce planters often plant 15 or 18 rows at a time, so the relative position of those rows stay the same even paths are not straight. Therefore, intelligent agricultural equipment will typically implement side-shift systems for the entire machine or at least more than a single plant line.

These devices use cameras nominally located over one or more plant lines. The vision system determines whether the device is centered or offset to one direction and controls hydraulic cylinders to counter the offset in the tractor position. On the whole, side-shift is a useful technology. However, it does not account for small variations between adjacent rows, conditions where individual plants have grown off the center-line, different shape plants, tolerance in the machine vision detection system or the problems controlling hydraulic cylinders.

The mechanical devices that plant and cultivate are mechanically fixed relative to each other. During setup, operators try to match the spacing set during planting for future operations such as cultivating. However, these adjustments are done by hand and are not perfect. Stacking up the setup positional errors across multiple lines could result in the error in any individual line of an inch relative to the line being used as a reference.

When seeds are dropped during planting, they can bounce and roll small distance from the desired plant location. This means that any individual plant may not be located on the plant line and if this plant is one used for tracking the side-to-side location, the vision system will make an error when determining the correct position for the side-shift. Existing commercial side-shift mechanisms are driven by hydraulic cylinders. Assuming the load is less than the maximum allowed, cylinders extend and contract at a fixed rate determined by the hydraulic system. While fine tuning is possible with hydraulics, it is not standard on farm equipment. Hence, standard control theory, such as PID controllers, is not particularly useful and it is hard to accurately position the side-shift. The end result is that even using a side-shift resulting in relatively poor positional accuracy for the actuator requiring the blades to have large clearance around the plant.

(4) Inability to Adjust for Different Plant Shapes: Finally, existing cultivators have a pattern that is set by mechanical stops, hydraulic variables and tractor speed. In these systems, the blades make the same path regardless of whether the plant is 6" or 6' wide and whether the plant is symmetric or is twice as large on one side of the centerline. As above, this means that the mechanical settings must be such to handle the worst case, or at least the worst reasonable case. This results in larger than desired clearances around the vast majority of plants and potential damage to a few plants.

For at least the limitations described above there is a need for an intelligent crop maintenance device with independently and variably controlled blades.

BRIEF SUMMARY OF THE INVENTION

One or more embodiments described in the specification are related to an intelligent crop maintenance device with independently controlled blades. The device may be used for any type of crop maintenance activity, including for example, without limitation, cultivating and weeding. A challenge for these activities is to treat the soil as close as possible to the growing plants without damaging the plants; embodiments of the system achieve this objective by using feedback control to independently move blades on either side of a row of crops closer to or further from the plants.

One or more embodiments may have one or more row maintenance units. Each row maintenance unit may be mounted to or coupled to a vehicle. A row maintenance unit may treat a row of plants in a field as the vehicle moves through the field. It may have two blades, an actuator corresponding to each blade, and a blade mount for each blade that couples the blade to its associated actuator. The two actuators may be independently controlled. The blades may be positioned initially on opposite sides of the row of plants. Each blade may be configured to drag on or below the surface of the soil as the vehicle moves through the field. Each actuator may be configured to position the corresponding blade at any position between a minimum and maximum, and to move the corresponding blade closer to or further from the row of plants. The actuator may also be configured to move the corresponding blade at a controllable speed. Control of blade position, speed, or both is in contrast to existing hydraulic systems that move through a given position from either minimum range to maximum range or vice versa, unable to place a blade at an arbitrary position and hold it in that position. Each row maintenance unit may have a sensor system that captures sensor data from the row of plants and from the blades or blade mounts. It may have a processor that repeatedly analyzes sensor data, calculates desired trajectories of the blades, and controls the actuators based on the desired trajectories. Sensor data analysis may determine characteristics of one or more plants in the row, such as the plants' positions, shapes, sizes, or orientations, and the position of the blades. The desired trajectories may be calculated so that the blades pass around the plants when they follow the desired trajectories, where the trajectories of the opposing blades may or may not be symmetric.

In one or more embodiments, the actuators may be variable speed actuators, and the processor may control the actuators by setting desired speeds and directions of motion. Illustrative actuators may be electric motors.

In one or more embodiments, the sensor of a row maintenance unit may be a camera, and the sensor data may be images from the camera. The position of the blades relative to the plants may be determined by analyzing the images to determine the position and orientation of one or more portions of the blade mounts, and by calculating the blade position from the blade mount positions and orientations. In addition to the cameras, the blade positioning system may include other sensors such as encoders on electric motors. In these embodiments, the encoders provide very accurate feedback relating the position and speed of the blades to the cameras and the vision system provides the means to precisely locate the blades relative to the individual plants.

In one or more embodiments, row maintenance unit may have a housing, rail, or carriage that is coupled to the vehicle. The blades, blade mounts, and actuators may be coupled to the housing, rail, or carriage with two couplings that enable rotation around a horizontal axis perpendicular to the direction of travel of the vehicle. When one of the blades encounters an obstacle, the associated blade, blade mount, and actuator may rotate to lift the blade relative to the obstacle.

One or more embodiments may not have a system level side-shift system. Instead, independent actuation of the blades may for example effectively accomplish the same centering shifting.

One or more embodiments may include a housing that is located over the blades and over one or more plants in the row; the housing may shade an area underneath the housing that contains these plants. A camera may be coupled to the underside of the housing; the camera may be oriented to capture images of the area under the housing that contains the plants. One or more lights may also be attached to the underside of the housing to illuminate the area.

One or more embodiments may also have a vehicle control system coupled to the drive train and steering system of the vehicle. This system may for example receive data from the sensors or processors of the row maintenance units, and use this data to steer the vehicle along the rows and to control the vehicle's speed so that blade actuators can generate the desired blade trajectories. In one or more embodiments the drive train and steering system may also be coupled to an operator control input; the vehicle control system may guide the vehicle along a row, and the operator may turn the vehicle at the end of a row and position it at a new row.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An intelligent crop maintenance device with independently controlled blades will now be described. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1A:
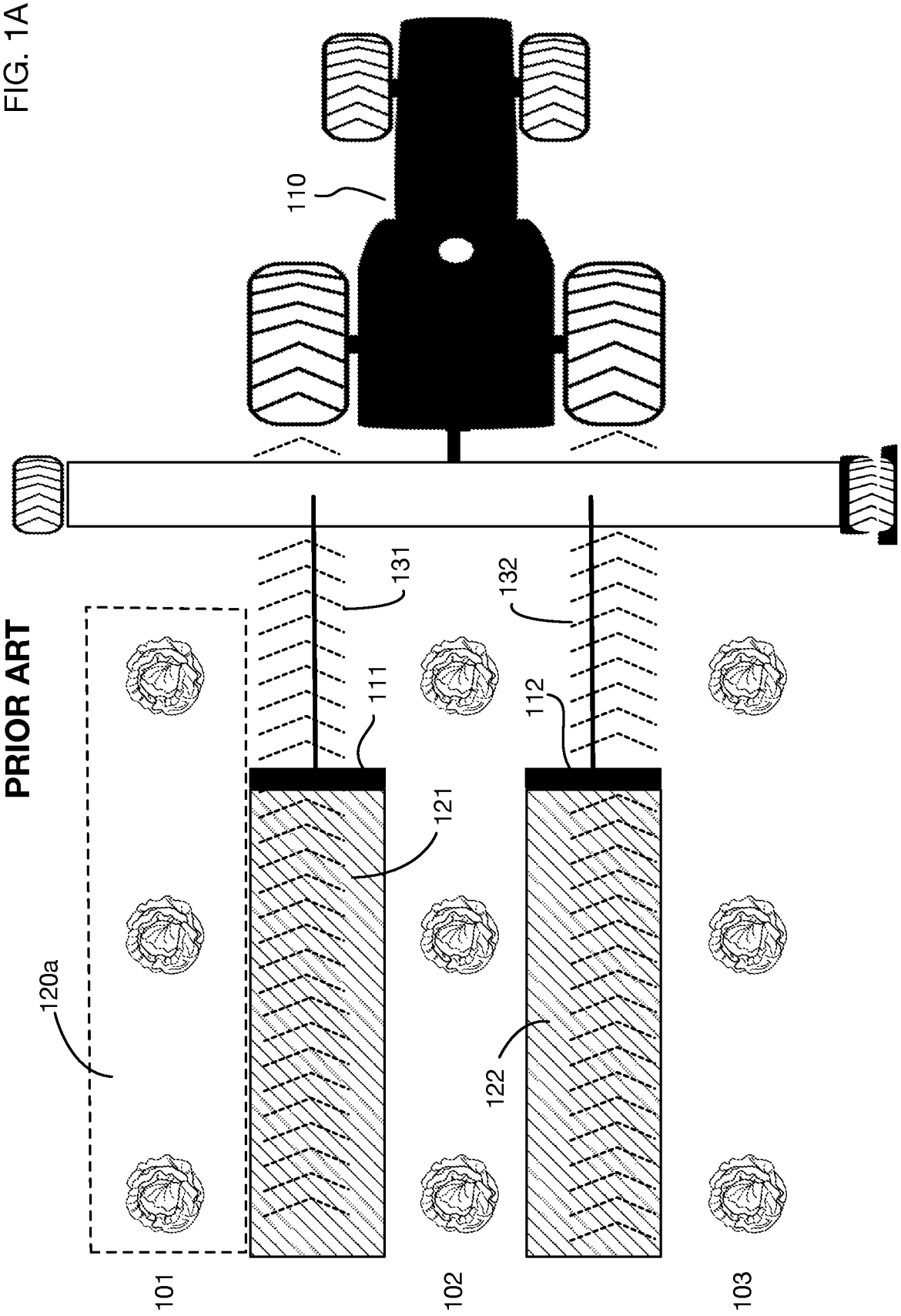
FIG. 1A illustrates prior art with a simple cultivator that drags blades in a straight pattern, showing that a large portion of the field is not cultivated.
Figure 1B:
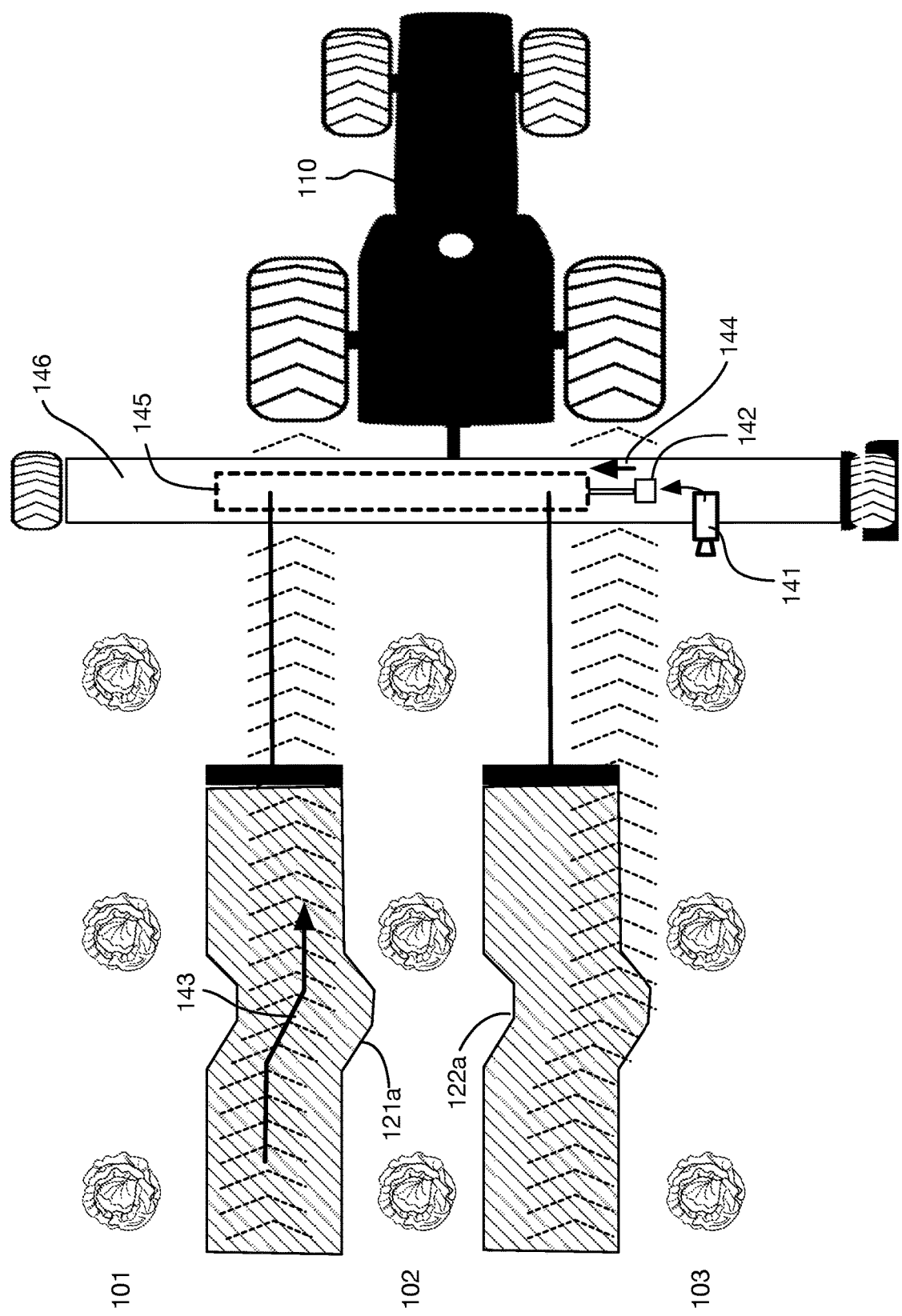
FIG. 1B illustrates prior art that has a side-shift actuator coupled to a camera, which attempts to compensate for variations in the tractor path.
Figure 2:
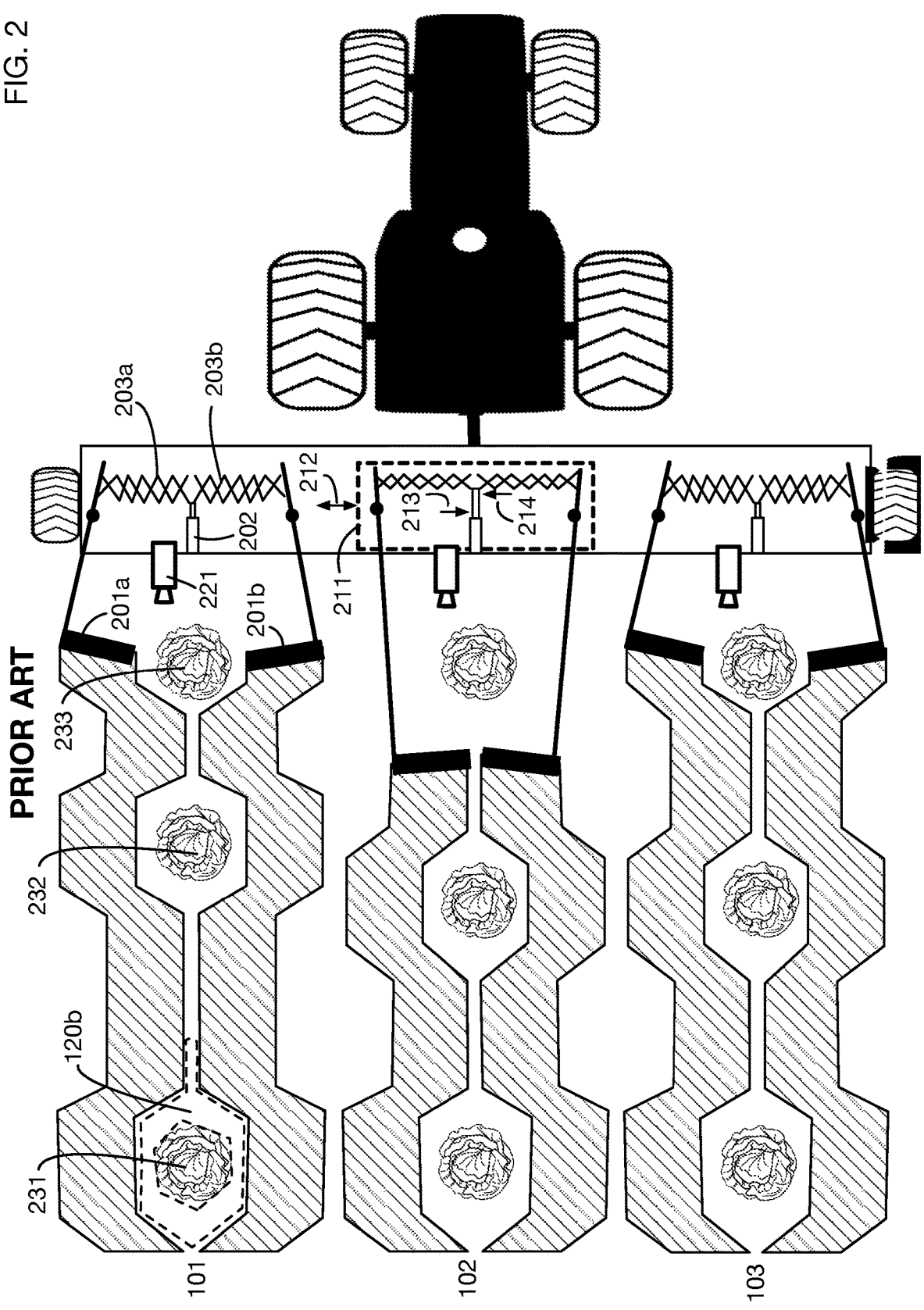
FIG. 2 illustrates prior art with a typical mechanical cultivator with reciprocating blades and mechanical adjustments.
Figure 3:
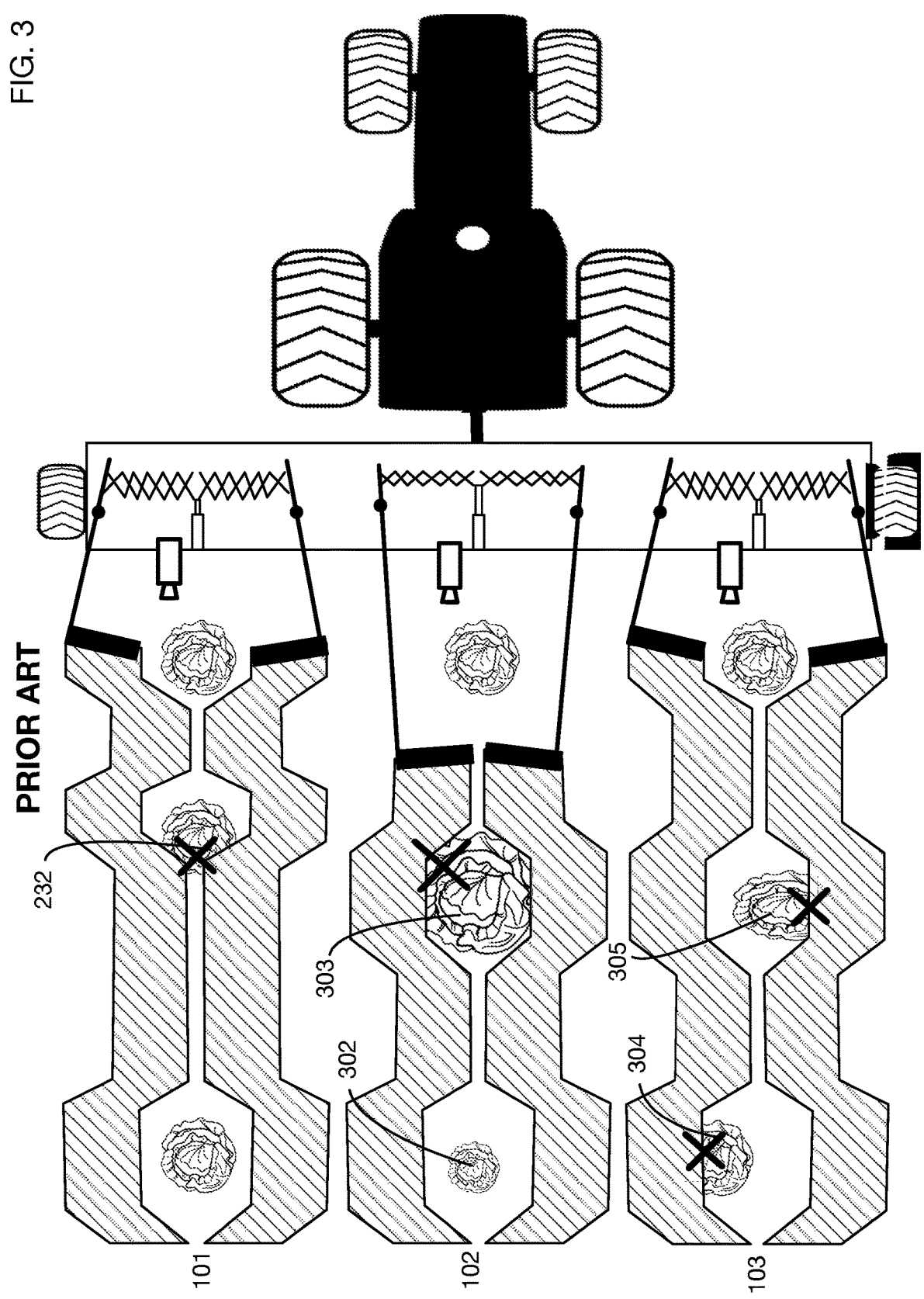
FIG. 3 illustrates potential limitations of the system of FIG. 2, showing that such a system is not able to effectively cultivate around plants of different shapes and sizes.

FIGS. 1 through 3 show devices that have been used in the prior art to maintain crops. Crop maintenance may consist of any activities that manage growing plants or the environment of the plants, encompassing a period between planting and harvesting. Typical crop maintenance activities may include, for example, cultivating and weeding. Cultivating may for example involve loosening or breaking up of the soil around the growing plants. Weeding may, for example, involve removal of undesirable plants that grow in the vicinity of the crop plants and compete for resources such as water, sunlight, or nutrients.

FIG. 1A shows a simple crop maintenance system that drags blades along and underneath the topsoil between rows of plants. For example, crop rows 101, 102, and 103 are maintained by dragging blades 111 and 112 along the soil between the rows. The blades may be pulled for example by a vehicle 110, such as tractor. This system treats areas 121 and 122, but a large portion of the soil around the crop plants is not treated. For example, zone 120a around crop row 101 is not treated by this system. The blades are linked to the tractor and follow the path of the tractor. As such, the clearance to the plants is limited by the uniformity and alignment of the plant rows as well as the ability of the tractor to accurately follow the plant line. In this example, the tractor drives in a straight line, as indicated by the tread marks 131 and 132 of the rear tires of the tractor; therefore, the blades also move in a straight line between the rows.

FIG. 1B shows the same simple crop maintenance system that includes a side-shift mechanism. The side-shift may compensate for some variations in the path of the tractor. In the scenario shown in FIG. 1B, the tractor path is not completely straight; a deviation 143 occurs as the tractor steers briefly to the right (downwards in the figure) before straightening out again. The system includes a camera 141 that observes the position of a plant row and recognizes when the tractor path has deviated relative to the plant row. The blades are coupled to a mount 145 that can shift left or right relative to the carriage 146 attached to the tractor. The camera 141 transmits a command to an actuator 142 that shifts the mount 145 to the right by an amount 144 (upwards in the figure) to compensate for the tractor deviation 143. The blade paths 121a and 122a deviate briefly to the left before the camera recognizes the tractor path variance and compensates with the side shift 144.

FIG. 2 shows a more sophisticated crop maintenance system available in the prior art that attempts to cultivate, weed, or otherwise maintain soil closer to the plants. In this system, pairs of blades are configured to move with a reciprocal motion around plants of each row. This system, which is commonly used in the existing art, includes a camera or other sensor some distance in front of the blades to identify the plants and an odometer to estimate when the blades are near the plants. A typical mechanical arrangement is to use a single hydraulic actuator for reach row maintenance unit; this single actuator drives both blades simultaneously. For example, hydraulic actuator 202 is connected by linkage 203a to blade 201a, and by linkage 203b to blade 201b. These blades 201a and 201b oscillate around the plants in a repeatable motion that is triggered approximately when the system calculates that the motion will be approximately centered on the plant. Typically, the motion of the actuator is a simple push and pull at with a fixed opening and closing cycles and fixed limit stops. The camera 221 associated with the actuator 202 identifies the spacing to the next plant in the row to be treated, and then uses data from an odometer (for example coupled to the axle) to determine when to trigger the opening motion of the actuator 202. The camera and odometer control system can therefore accommodate some variation in spacing between plants along a row. For example, although plants are spaced regularly along rows 102 and 103, in row 101 plant 232 is further from plant 231 and closer to plant 233. The camera and odometer system can accommodate this variation and can leave the blades closed until they approach plant 232. However, inaccuracies in odometer readings may cause blades to open too soon or too late, thereby damaging plants. The actuator 202 is programmed to make a repeated motion without any control system to provide feedback on blade positions. In addition, the use of a single actuator to control both blades requires that the two blades move in mirror images of one another and the contour around each plant is identical to all plants in a row as long as the tractor moves at the same speed and will shorten or elongate if the tractor slows down or speeds up. The triggers that turn on the actuator (open and close) are set based on odometer readings estimating when they have advanced to where the camera identified a plant. As a result of this simple design, the system cannot accommodate large variations in plant positions, sizes, or shapes, as illustrated below in FIG. 3. Therefore, users typically leave a large margin around the plants to ensure that plants are not accidentally damaged. As shown in FIG. 2, a large region 120b between the blades may be left untreated.

The mechanical systems used in the prior art may provide for some mechanical adjustments and calibrations, which may be used to set up the system before starting to treat one or more rows. These adjustments may be used for example to account for different spacing between rows for different crops, or for different spacings between plants within a row for different crops. Typical adjustments may be for example a shifting adjustment 212 that shifts an entire row maintenance unit (with both blades) horizontally along the axis perpendicular to a row, and adjustments 213 and 214 to set mechanical limit stops for the hydraulic actuator, to control the period of motion for example to match the spacing between plants along a row. These adjustments cannot be used dynamically as the vehicle moves through the field. The system may include an optional side-shift mechanism similar to the mechanism 142 in FIG. 1B that dynamically moves the entire system side-to-side to track the plant rows but does not affect the individual motion of any of the blades.

FIG. 3 continues the example of FIG. 2 to illustrate some drawbacks of this type of system. If, for example, the odometer accuracy of the system as it approaches plant 232 is poor, the blades may strike the plant, damaging or destroying it. If plant 303 has grown larger than other plants in the row or in the field, the spacing configured between the blades may be insufficient for this plant, and the blades may strike this plant. Similarly, if plant 302 is smaller than other plants, the area around this plant that is not treated may be excessively large since the blade movements are configured for the average plant size. A system level side-shift mechanism may be able to compensate for tractor drift, but it may not be effective at compensating for offsets of individual plants from the row centerline; for example, plant 304 may be damaged or destroyed. An asymmetrical plant like plant 305 may also be damaged or destroyed, since the blade openings are configured for a typical or average plant.

Figure 4:
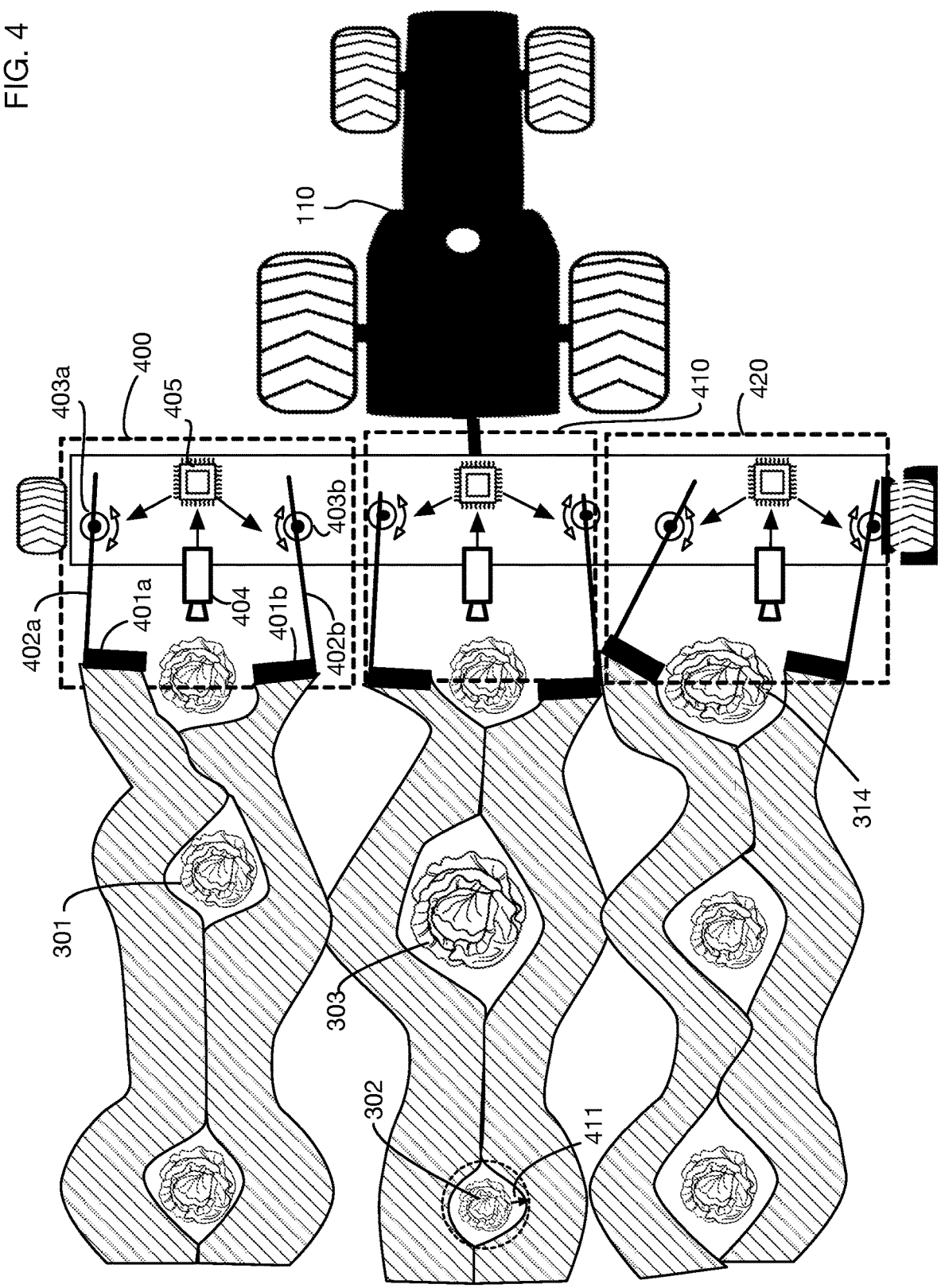
FIG. 4 shows an embodiment of the invention with row units with two independently controlled blades, and a processor that analyzes camera images to control the blade positions.

One or more embodiments of the invention may provide more robust and extensive feedback control to address the issues illustrated in FIGS. 1, 2, and 3. As an improvement over systems available in the prior art, in one or more embodiments control may be provided for individual blades, using an actuator for each blade instead of an actuator per blade pairs as shown in FIGS. 2 and 3. The feedback control of individual blades may allow embodiments of the system to treat soil much closer to plants, and to compensate for many types of variability such as variations in plant position, size, and shape. FIG. 4 shows an embodiment of the invention with three row maintenance units 400, 410, and 420, each configured to tend a corresponding row of plants in the field. These units may perform any type of crop maintenance activity or activities, including but not limited to cultivating and weeding. Each row maintenance unit is coupled to vehicle 110, which may be any type of device that provides motion down the field. A vehicle may be coupled to any number of row maintenance units. The row maintenance units may be mounted to a trailer for example, which may be towed by vehicle 110. In one or more embodiments, row maintenance units may be integrated into a vehicle instead of being towed behind such a vehicle. Alternatively, the maintenance units may be mounted on an autonomous, or semi-autonomous, platform such as a robot. Illustrative row maintenance unit 400 has two blades 401a and 401b, each initially positioned on opposite sides of the row of plants. These blades are actuated by separate actuators: blade 401a is actuated by actuator 403a, and blade 401b is actuated by actuator 403b. Actuators 403a and 403b may be any type or types of actuators, including but not limited to electric motors. In one or more embodiments, actuators 403a and 403b may be controllable to provide for variable speed motion and position in any direction, movement to a selectable position (between some maximum and minimum positions), or motion at a controllable acceleration, torque, or force. The actuators may be proportionally controlled in one or more embodiments, in that the actuator outputs (such as position, speed, acceleration, torque, or force) may be proportional to inputs. Actuators may be controlled by either or both of analog inputs and digital inputs.

Blades 401a and 401b are coupled to blade mounts 402a and 402b, respectively, which are in turn coupled to and driven by actuators 403a and 403b, respectively. Blade mounts 402a and 402b may be any types of linkages, arms, levers, or couplings that transmits actuator motion to the blades. Actuators, blade mounts, and blades may be mounted in any position and orientation.

Blades may be configured to scrape or glide along the top of the soil or to slide under the surface of the soil as the vehicle 110 moves through the field. A blade may be of any shape and size. In one or more embodiments a blade may be replaced by or supplemented by any implement or device, for example to support spraying of a field, depositing of material, removal of material, or any other maintenance activity.

The embodiment illustrated in FIG. 4 provides feedback control for each of the two blades in each row maintenance unit. This control may for example obtain data from a sensor or sensors 404 in each row maintenance unit, process this sensor data with a processor 405 coupled to the sensor, and transmit commands from the processor to the two actuators 403a and 403b. The feedback control system controls the movement of the blades to contour the blades around each plant with a close tolerance, and to provide this close contouring even if there is significant variation in plant position, orientation, shape, and size. For example, the control system of row maintenance unit 410 may move the blades closer together to contour around small plant 302, and further apart to contour around larger plant 303. One or more embodiments may control blades to ensure that the radial distance 411 between a plant and the treated region is always at or below some minimum value, regardless of the plant's size, shape, or position. The blade controls of the systems illustrated in FIGS. 2 & 3 simply determine when to trigger the mechanics to open or to close the blades. The invention illustrated in FIG. 4 uses its sensors to determine an optimal blade trajectory around each plant.

In one or more embodiments, processor 405 associated with a row maintenance unit may be any type of processing device or devices, including for example, without limitation, a microcontroller, a microprocessor, a single board computer, a computer, an analog circuit, a customized ASIC or FPGA, or a network of such devices. One or more embodiments of processor 405 include internal components such as a memory, a bus, input/output interfaces for communication and software instructions that specifically implement the functionality required by the system. The processor 405 may also be coupled to any other external components such as memory, network interfaces, and coprocessors such as GPUs or DSPs. In one or more embodiments, a single processor may provide control for more than one row maintenance unit. In one or more embodiments, each actuator may have a dedicated control processor.

Sensor or sensors 404 may be any type or types of sensors, including for example, without limitation, a camera, with sensitivity in any visible or invisible frequencies; a LIDAR; a radar; an ultrasonic rangefinder; an environmental sensor that measures temperature, moisture, light, or other variables. In one or more embodiments, sensor 404 may include an encoder or other measurement device coupled to each of the actuators 403a and 403b. One or more embodiments may obtain sensor data from multiple sensors. Sensor data may observe for example the plants in the row associated with the row maintenance unit, and the blades 401a and 401b. In some situations, the blades may not be directly observable (for example, they may be under the soil), and sensor data may capture other information that may be used to infer the position of the blades. For example, blade position and orientation may be derived from encoder data, or from observations of features on the blade mount that are visible even when the blade is under the soil. One or more embodiments of the invention may specifically mark or add markers to the blade-arm-actuator system such that the sensor can directly determine the blade position relative to the plant.

In one or more embodiments, sensor 404 may be a camera that is oriented to capture images of the plants in the row and of the blades or the blade mounts. Processor 405 may analyze these images to determine one or more characteristics of the individual plants—such as each plant's position, shape, size, or orientation—and the position and orientation of the blades. The processor may then plan a desired trajectory for each blade to come as close as possible to the plants within the constraints of the actuators and the motion of the vehicle, and it may transmit commands to the blade actuators to implement these blade trajectories. These observations, calculations, and commands may be repeated in a loop to provide feedback control and to compensate for unexpected variations or noise.

The embodiment illustrated in FIG. 4 may not have and does not require any system level side-shift mechanism to shift the full unit side-to-side to account for misalignment between the vehicle path and the plant line orientations. All shifting may be performed dynamically by the actuators. This automated shifting in response to plant locations is in contrast to the systems in the prior art, such as that of FIG. 1B and FIG. 2, which may use global side-shift systems to improve accuracy. Eliminating such a mechanism is simpler and less expensive than inclusion of it. It also enables optimal positioning for each plant row instead of a globally best compromise position for the collection of maintenance units. Furthermore, having the sensors observe the plants and blades simultaneously enables inherent positioning accuracy without requiring manual mechanical adjustments and calibrations. The operation of embodiments of the invention is therefore simplified compared to the prior art because more of the blade control is automated.

Figure 5:
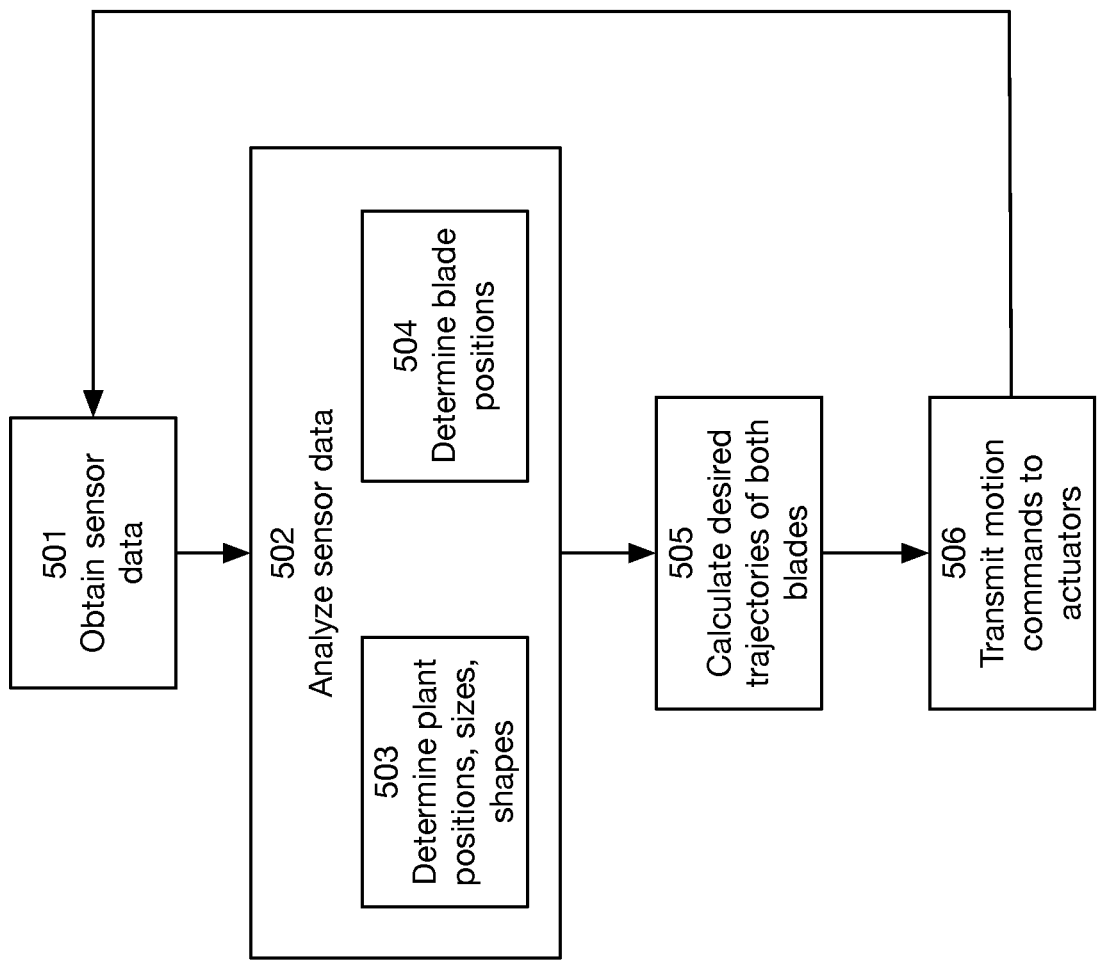
FIG. 5 shows an illustrative control loop executed by the processor to adjust blade positions to pass around the plants.

FIG. 5 shows a feedback loop that may be implemented in one or more embodiments. Sensor data is obtained in step 501, from a sensor (or sensors) associated with a row maintenance unit. This data is analyzed in step 502, which includes determination 503 of the plant positions, sizes, and shapes, and determination 504 of the blade positions. Step 505 then calculates desired trajectories for both blades of a row maintenance unit, and step 506 transmits motion commands to the actuators for each blade to achieve the desired trajectories, or to move the blades closer to the desired trajectories. This loop may be repeated at any desired frequency. The trajectories of the two blades are independent; the blades do not need to move in reciprocal motions like those of prior art systems like the system of FIG. 3. This independent control of each blade allows the system to contour around plants that are asymmetrical (like plant 305 of FIG. 3) or offset from the row center line (like plant 304 in FIG. 3).

Figure 6:
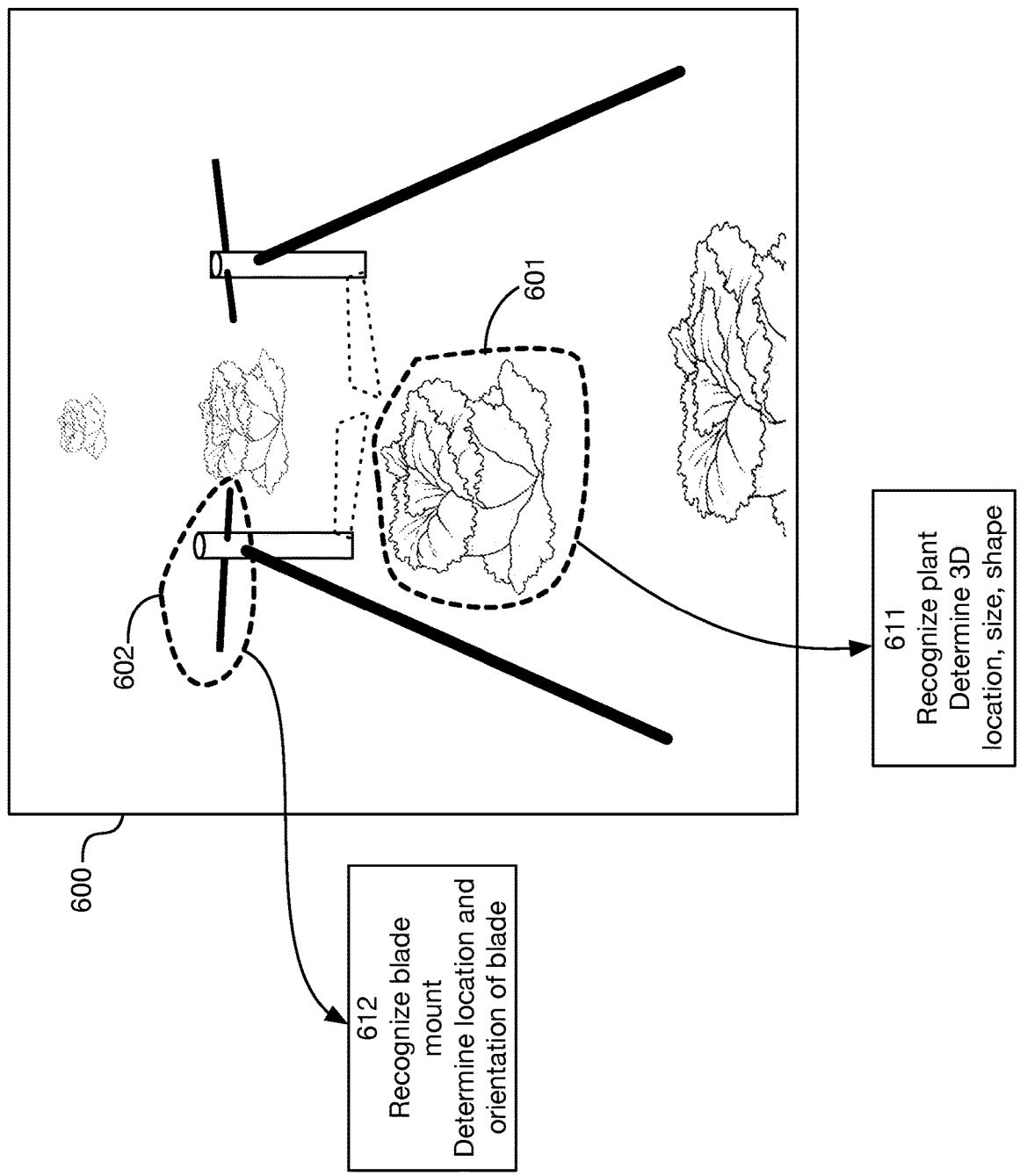
FIG. 6 shows an illustrative image analysis that may be used to determine blade positions and orientations and to determine the location, size, and shape of plants.

FIG. 6 illustrates analysis of sensor data to determine the location and orientation of blades and plants. This example is shown for a sensor that is a camera; similar analyses may be performed for data from any type or types of sensor. Camera image 600 is taken in this example from a camera looking backwards and downwards at the row of plants and at the blades being dragged below the soil. Cameras may be located in any position and orientation. The camera may observe one or more plants in front of the blades, so that the processor can plan the future trajectory of the blades. In step 611, the processor analyzes the image 600 to recognize plants and to localize regions such as region 601 that contain plant images and region 602 that has markers that indicate the blade location underground. This step may use for example any type of pattern recognition technology such as a neural network trained to recognize and localize the specific types of plants in the field. Having located the region 601 containing the plant, the known position and orientation of the camera relative to the vehicle may be used to calculate the shape, size, and location of the plant from the image. The shape, size, and location of the plant may be determined in 2D (for example, to determine the projection of the plant onto the horizontal plane of the field) or in 3D. In some applications, a 2D model of the plant's location, size, and shape may be sufficient, whereas other applications may benefit from a 3D model. A 3D model may be calculated from the 2D image 600, or one or more embodiments may use stereo cameras or other 3D scanning technologies to obtain a 3D map of the plant directly.

Image 600 may also be analyzed in step 612 to determine the location and orientation of the two blades. (The size and shape of the blades will be fixed in many applications, so this data may be known.) Because the blades may not be visible in some applications, such as when they are dragged beneath the soil, the system must infer the blade positions and orientations from other information. Alternatively, encoders or other sensors may precisely determine the blade location relative to the camera and the vision system uses the image (600) only to localize the blade system relative to the plants.

FIG. 6 shows an illustrative technique where a marker on a portion of the blade mount may be used to infer the position and location the corresponding blade. The system first localizes this marker to region 602, and then analyzes the image in this region to determine the orientation of the marker. The marker may be for example parallel to the blade or in any other known relative orientation, so that the blade orientation may be calculated directly from the marker orientation. A marker may be a physical protrusion or other feature, as shown in FIG. 6, a color or pattern, or a combination thereof.

Figure 7:
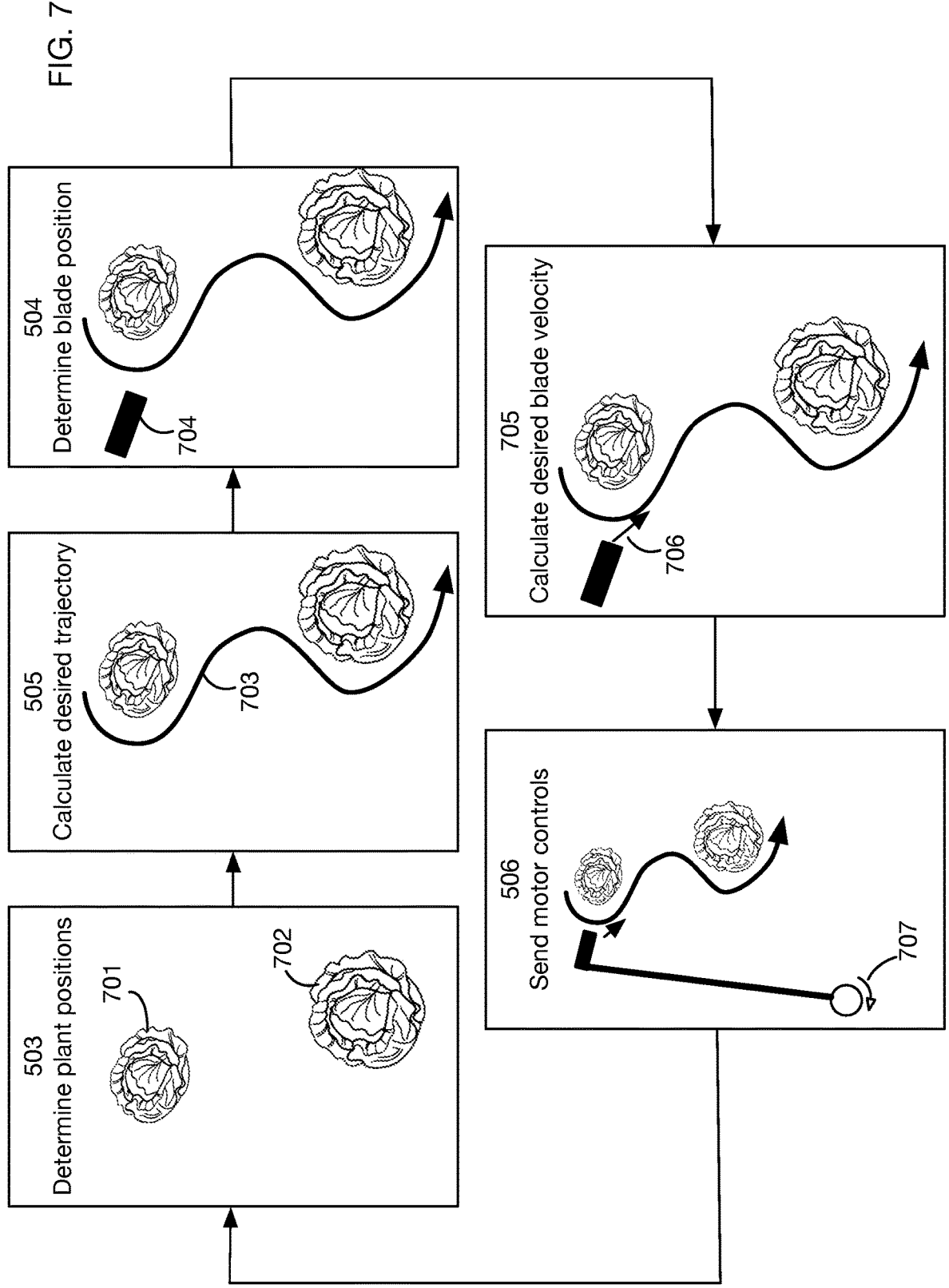
FIG. 7 illustrates execution of the control loop described in FIG. 5.

FIG. 7 shows illustrative calculations for the feedback loop of FIG. 5. For simplicity, these calculations are illustrated in 2D. In step 503, plant positions, shapes, and sizes 701 and 702 are determined from sensor data. In step 505, a desired trajectory 703 is calculated for one of the blades. (A similar calculation is made for the other blade.) This desired trajectory 703 may for example pass as close as possible to the plants 701 and 702, given the constraints on motion from the actuators and the vehicle, the precision with which the system can determine plant locations, shapes, and sizes, and the desired tradeoff between close trajectories and the risk of inadvertently hitting a plant. Step 504 determines the current blade position 704. In this illustrative example, the current blade position is not on the desired trajectory 703. This situation may occur for example if the system obtains new information that changes the desired trajectory, or if the vehicle has not moved directly parallel to the plant row, or if the blade has previously been knocked off of its desired trajectory by obstacles, soil differences, vibrations, or other disturbances. In step 705, the system calculates a velocity vector 706 that may move the blade towards the desired trajectory 703. The blade velocity vector 706 may reflect both the motion of the blade's actuator and the forward movement of the vehicle to which the row maintenance unit is attached. In step 506, the system calculates the actuator component of the velocity and translates this into commands 707 that are transmitted to the actuator.

Figure 8:
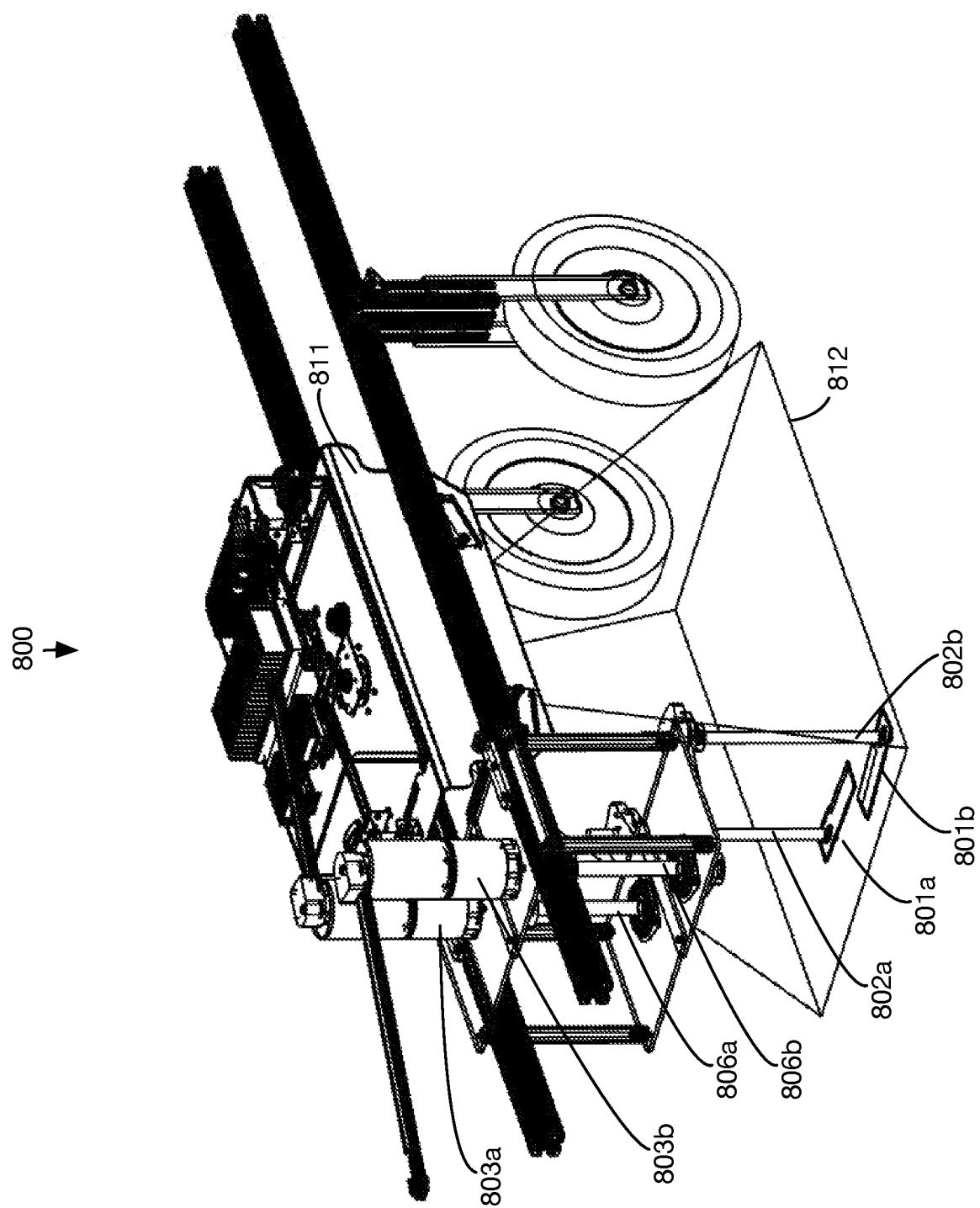
FIG. 8 shows an illustrative embodiment of a row maintenance unit with electric motors mounted vertically above blades, and a housing that provides shading and uniform lighting for the plants beneath.

FIG. 8 shows another variation of a row maintenance unit 800. Like the units illustrated in FIG. 4, this unit has two blades 801a and 801b. Each blade has an independently controlled actuator, which in this illustrative embodiment is an electric motor. Actuator 803a moves blade 801a, and actuator 803b moves blade 801b. However, the blade mounts are primarily vertical, and the motors are mounted vertically over the blades. The linkage between the motor 803a and blade 801a includes a vertical shaft 806a, a horizontal member that is not visible in this view, and a second vertical shaft 802a. Similarly, motor 803b is coupled to blade 801b via shaft 806b, a horizontal member, and shaft 802b.

In the embodiment shown in FIG. 8, a housing 811 is located over the plants in the row that are directly ahead of the blades 801a and 801b. This housing serves as a shade to control the lighting conditions of the soil and plants underneath; it may contain lights (described below) to illuminate this area with constant lighting. Use of a housing or other shade, possibly combined with lights, may improve the quality and consistency of images captured by a camera or other sensor, which may facilitate image analysis to identify the position, size, and shape of plants. In this embodiment, a downward-facing camera is located on the underside of housing 811. The field of view of this camera 812 contains the blades 801a and 801b, as well as the soil and plants ahead of the blades (in the direction of travel of the vehicle) and underneath the housing. Positioning the camera above the blades and the plants may simplify image analysis since the image may largely correspond to the 2D profile of the plants on the horizontal ground plane.

Figure 9:
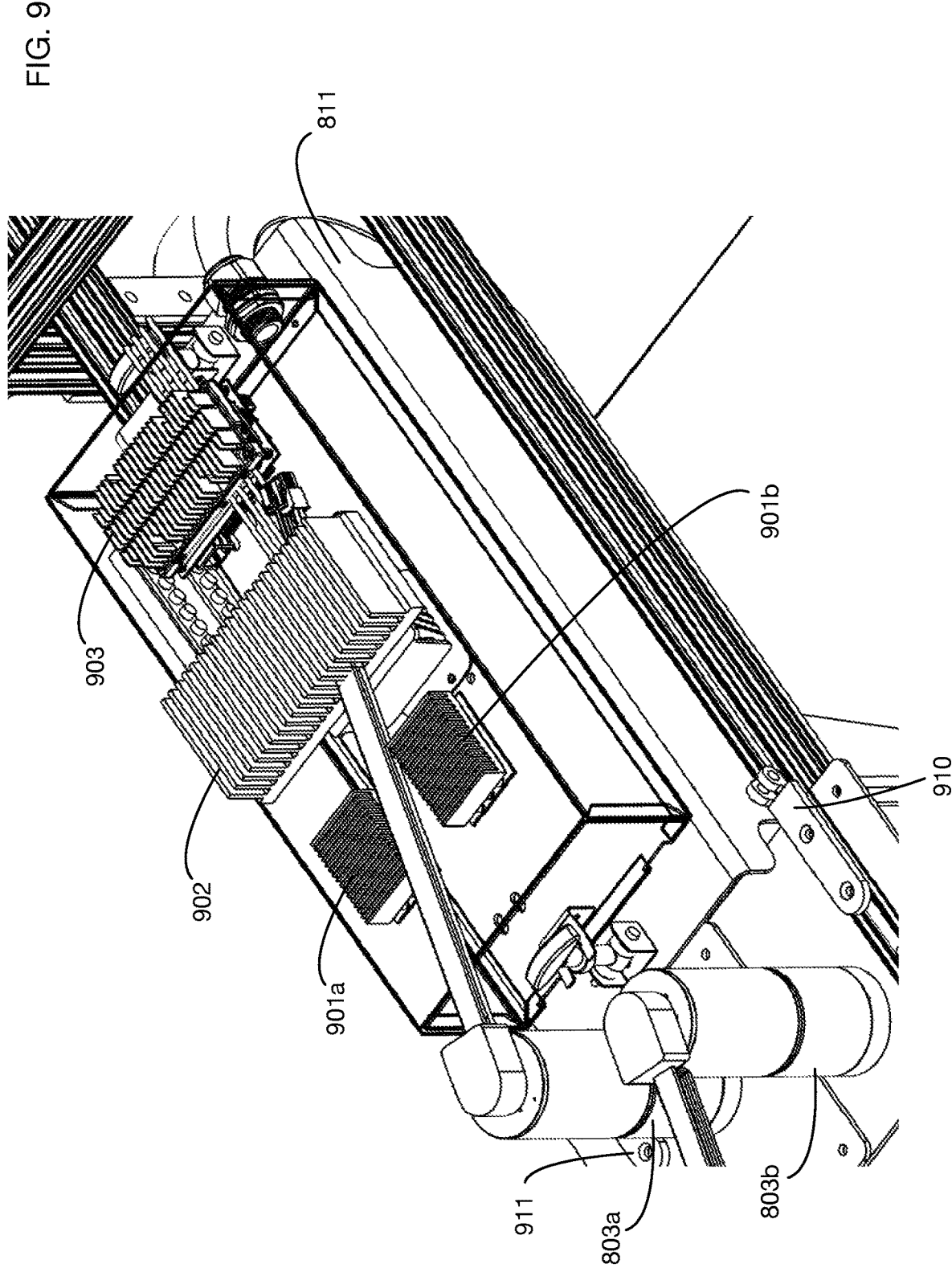
FIG. 9 shows a close-up view of the electronic modules on the embodiment of FIG. 8.

Housing 811 may also contain electronics for the row maintenance unit, as illustrated in FIG. 9. In this illustrative embodiment, the electronics modules include motor controllers 901*a* and 901*b*, power transformer 902, and processor 903. The heat sinks above each module are visible in FIG. 9. The motor controllers 901*a* and 901*b* in this illustrative embodiment take pulse wave modulation signals from the processor 903 and convert them to signals to the motors 803*a* and 803*b*, respectively. The power transformer 902 converts input power, which in this embodiment is at 48V, and converts it to voltages needed by motors and other electronics. The processor 903 in this illustrative embodiment is a Nvidia TX2®. The processor receives images from the camera (which is mounted underneath) and generates control signals for the motor controllers. The processor may also receive encoder inputs from encoders attached to the motors; these inputs may be used (possibly in conjunction with video analysis) to determine the position and orientation of the blades. If used, the encoders would accurately determine and control the position of the actuators and blades relative to the sensor (camera) and the processor determine the position of the entire maintenance unit relative to the plant.

FIG. 9 also illustrates a hinge coupling 910 connected to the assembly that contains motor 803*b*, the blade 801*b*, and the blade mount couplings that attach the motor 803*b* to the blade 801*b*. This hinge 910 couples the assembly to the housing 811 or to a rail or carriage on which the housing is mounted. The hinge allows the motor/blade/blade mount assembly to rotate relative to the housing and the rail or carriage. This rotation may for example allow the blade to lift up around any obstacles; this rotation is described below with respect to FIG. 11. A similar hinge 911 (which is only partially visible in the view of FIG. 9) may couple the motor/blade/blade mount assembly for blade 801*a* and motor 803*a* to the housing or to a corresponding rail or carriage. The assemblies for both motors may be either coupled together, so that they rotate as a unit, or they may rotate independently.

Figure 10:
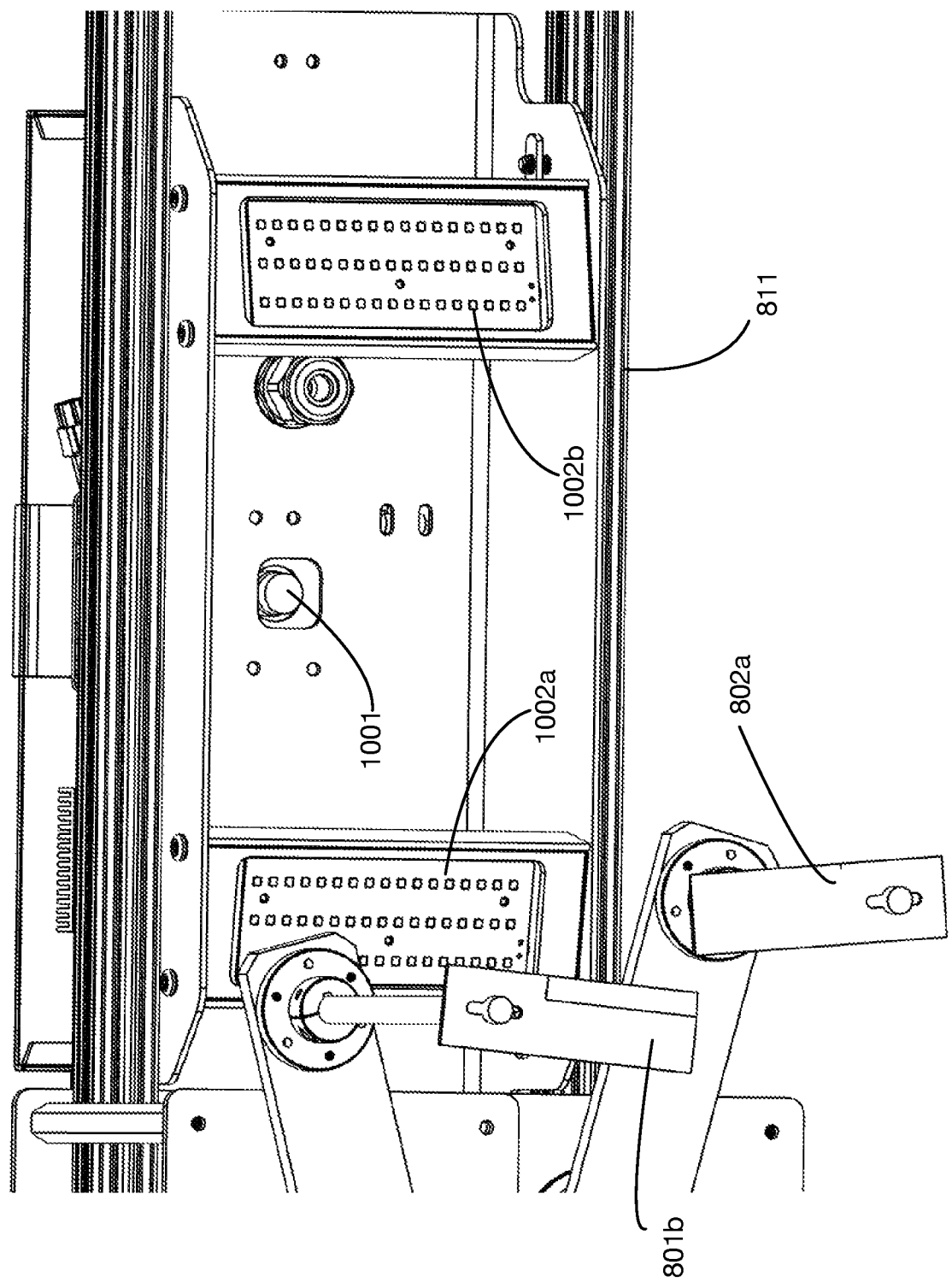
FIG. 10 shows a view of the underside of the housing of the embodiment of FIG. 8, showing a downward-facing camera and downward-facing lighting modules.

FIG. 10 shows a view of the underside of housing 811, viewed from below. Camera 1001 is mounted on this side, so that it views the soil underneath the housing. Lights 1002*a* and 1002*b* are also mounted on the underside of the housing 811 to provide consistent lighting of the scene to facilitate image analysis. The lights 1002*a* and 1002*b* may be for example arrays of LEDs.

Figure 11:
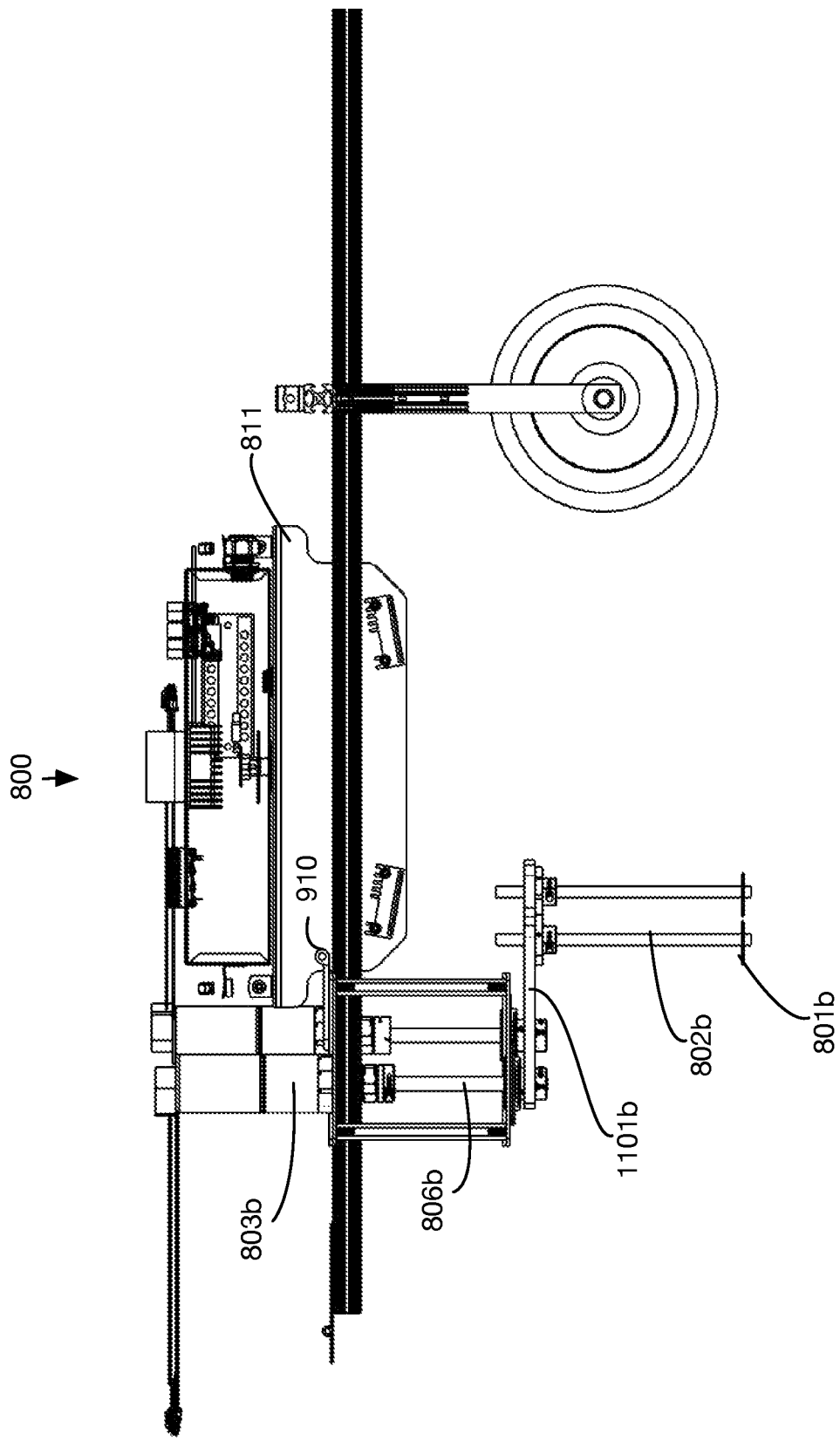
FIG. 11 shows a side view of the embodiment of FIG. 8.

FIG. 11 shows a side view of row maintenance unit 800. This view illustrates the complete linkage between the motors and the blades. Blade 801*b* is coupled to vertical shaft 802*b*, which is coupled to horizontal member 1101*b*, which is coupled to another vertical shaft 806*b*, which is coupled to motor 803*b*. A similar linkage connects the other blade to the other motor. This linkage design is illustrative; one or more embodiments may couple any type of actuator to any type of blade or other implement in any desired manner. The actuator-blade systems 803*a*/801*a* and 803*b*/801*b* are optionally offset along the plant row so the blades can cross the center line without interference. Alternatively, the blades may be offset vertically (at different heights) to perform the same function. Offsetting a blades front-to-back is not an attractive option for existing systems in the prior art, such as those illustrated in FIGS. 2 & 3, because the motions cannot be controlled independently resulting in a non-symmetric motion around the plant requiring additional clearance.

Figure 12:
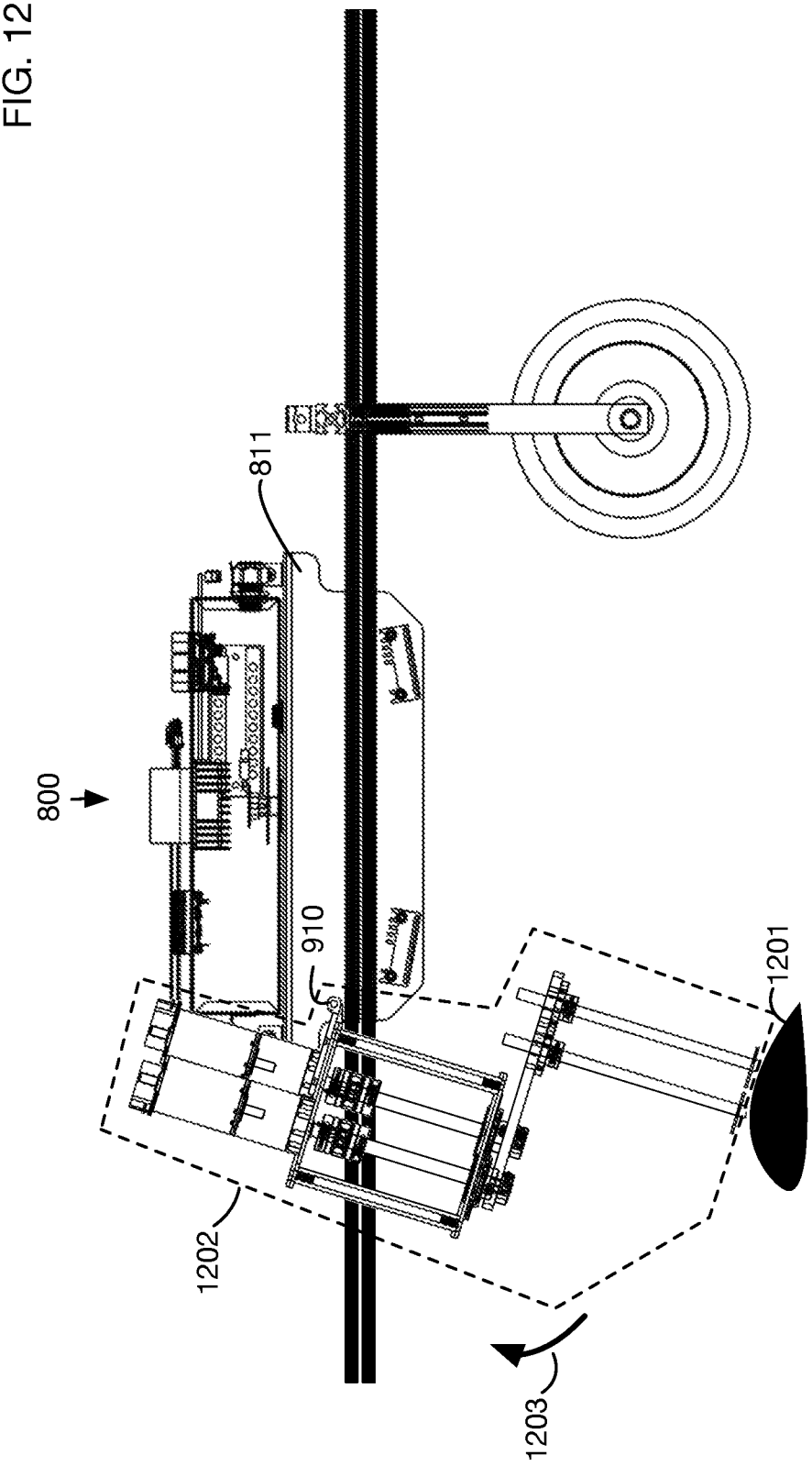
FIG. 12 shows the embodiment of FIG. 8 from the size with the motor/blade/blade mount assembly rotated upwards when the blades hit an obstacle.

FIG. 11 also shows the hinge 910 that connects the assembly with the motors, linkages, and blades to housing 811. This view shows the blades in their lowered positions, where they travel along or underneath the soil. FIG. 12 shows a corresponding side view of row maintenance unit 800 with the motors, blades, and blade mounts rotated upwards. If one or both of the blades encounters an obstacle 1201, such as rock, the blade or blades will receive a strong resisting horizontal force, which will generate a torque of the motor/blade/blade mount assembly 1202 around hinge 910, and possibly also around the corresponding hinge on the opposite side of the unit. This may cause a rotation 1203 of assembly 1202, which lifts the blades and causes them to pass over the obstacle. This rotation and lifting process may be entirely passive in one or more embodiments. One or more embodiments may alternatively or additionally provide one or more actuators to lift the blades if the system detects resistance or obstacles.

Figure 13:
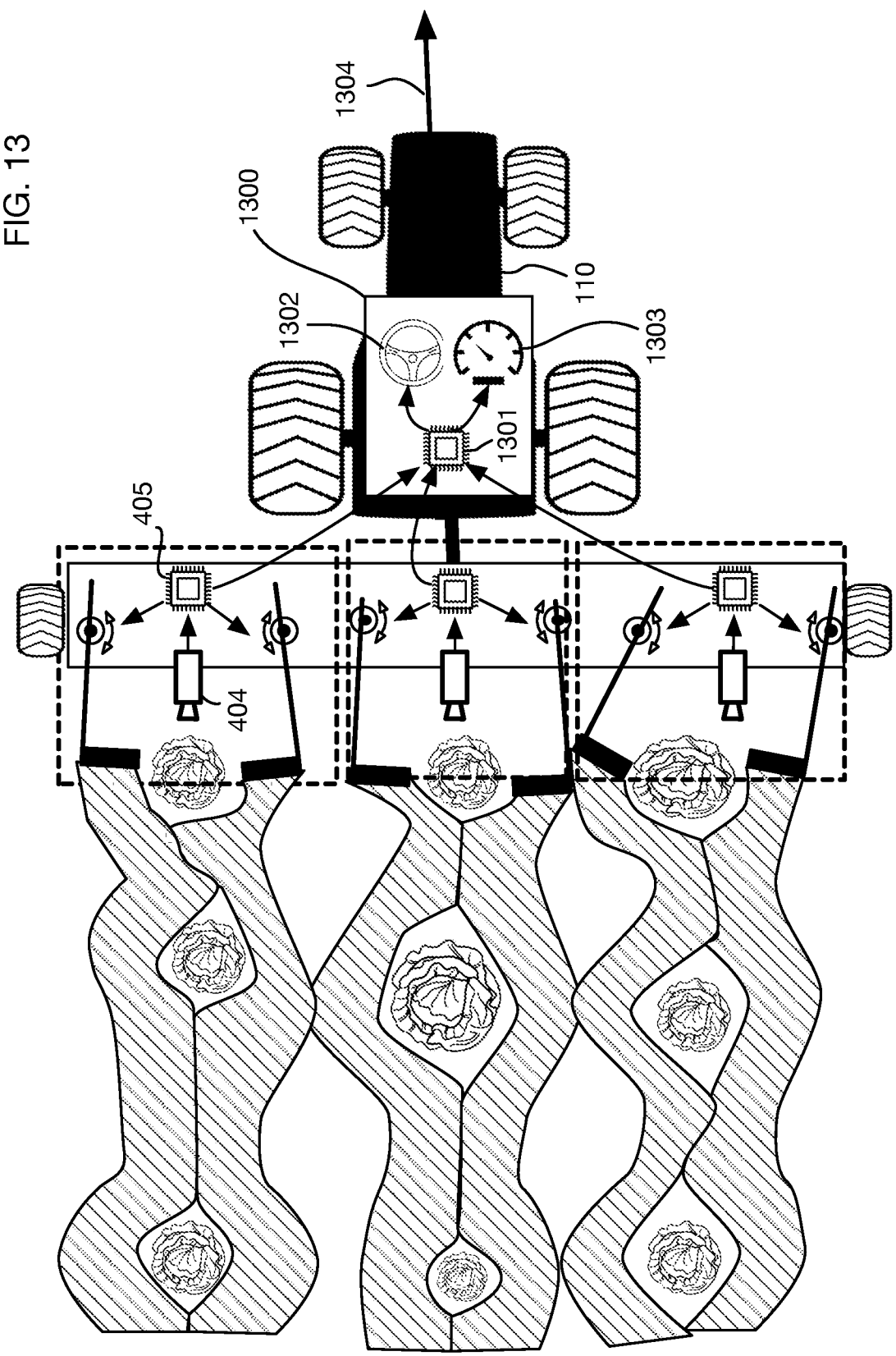
FIG. 13 shows an illustrative embodiment that includes a vehicle control system that adjusts the vehicle velocity based on sensor inputs.

One or more embodiments may also have a vehicle control system coupled to the drive train and steering system of the vehicle. This vehicle control system may be coupled to the processors of the row maintenance units or directly to the sensors (such as cameras and encoders). FIG. 13 shows an illustrative embodiment with a vehicle control system 1300 integrated into tractor 110. Data from processors such as processor 405 are transmitted to a vehicle control processor 1301. In one or more embodiments the vehicle control processor 1301 may be one or more of the row maintenance unit processors. The processor 1301 analyzes data collected by the sensors, or data generated by the row maintenance processors, to determine whether and how to adjust the vehicle velocity 1304. The velocity adjustments are achieved by transmitting commands to a steering system 1302 and to a drive train system 1303 that controls the vehicle speed. The vehicle steering 1302 may be used for example to keep the vehicle path aligned along the rows of plants, or to adjust the vehicle path if the rows of plants are not straight. Speed control 1303 may be used to ensure that the actuators controlling the blades have sufficient time to achieve the desired blade trajectories. For example, under certain circumstances the system may detect that a rapid change in blade trajectory is needed, and the vehicle speed may be slowed temporarily to give the blade actuators time to make this adjustment.

Rows of plants provide excellent markers identifying the desired vehicle path along a row. In addition to calculating the blade trajectories from sensor data, in one or more embodiments the row maintenance unit processors may use the same data to calculate the vehicle trajectory, or forward data to the vehicle control processor 1301 for this calculation. The vehicle control system can then guide the system along the rows. One or more embodiments may use GPS and/or other sensors to create a fully autonomous system, for example that can drive a vehicle around an entire field. However, a system that simply tracks along the row can be coupled with a tele-operated feature for a viable semi-autonomous unit. The tele-operational portion may include a manual control joy stick or other operator control input coupled to the steering system and drive train. An operator may use this operator control input to control the motion of the vehicle to turn it and position it at the next starting point at another row. This remote control may be performed by an operator directly at the vehicle or by a remote operator that uses cameras to position the vehicle such as used with drones.

For crops planted on beds, in addition to the plant rows providing a tracker lines, the raised beds further constrain the motion. In some embodiments, the vehicle that supports the maintenance units is small enough that the raised beds restrict the motion to follow the beds. These embodiments are semi-autonomous where they only travel independently along the row. They must be manually positioned at the start of the row and manually moved between the rows but travel autonomously along the row.

While the invention herein disclosed has been described by means of specific embodiments and applications thereof, numerous modifications and variations could be made thereto by those skilled in the art without departing from the scope of the invention set forth in the claims.

What is claimed is:

1. An intelligent crop maintenance device with independently controlled blades, comprising:
   one or more row maintenance units, each row maintenance unit of said one or more row maintenance units configured to be mounted to a vehicle and to treat a row of plants in a field as said vehicle moves through said field, wherein said each row maintenance unit comprises
      a first blade configured to drag along or below a soil surface as said vehicle moves through said field;
      a first blade mount coupled to said first blade and said vehicle;
      a first actuator configured to position said first blade at any position between a first minimum position and a first maximum position wherein said first actuator is coupled to said first blade mount and is configured to move said first blade closer to or further from said row of plants;
      a second blade configured to drag along or below said soil surface as said vehicle moves through said field;
      a second blade mount coupled to said second blade and said vehicle; and,
      a second actuator configured to position said second blade at any position between a second minimum position and a second maximum position wherein said second actuator is coupled to said second blade mount and is configured to move said second blade closer to or further from said row of plants;
      wherein
         said first blade and said second blade are configured to be positioned initially on opposite sides of said row of plants; and
         said first actuator and said second actuator are independently controlled;
   one or more sensors configured to capture sensor data from said row of plants;
   a processor coupled to said one or more sensors, to said first actuator, and to said second actuator, and configured to
      analyze said sensor data to determine one or more characteristics of one or more plants of said row of plants, wherein said one or more characteristics comprise one or more of position, size, shape, and orientation;
      calculate a desired first trajectory of said first blade, and a desired second trajectory of said second blade based on a current position of said first blade and of said second blade and based on said one or more characteristics of said one or more plants, wherein
         when said first blade and said second blade follow said desired first trajectory and said desired second trajectory, said first blade and said second blade pass around said one or more plants; and,
      control said first actuator and said second actuator based on said desired first trajectory and said desired second trajectory.

2. The intelligent crop maintenance device of claim 1, wherein
   said one or more sensors are further configured to capture sensor data from
      at least a portion of said first blade or said first blade mount; and
      at least a portion of said second blade or said second blade mount; and,
   said processor is further configured to
      analyze said sensor data to determine the current position of said first blade and of said second blade.

3. The intelligent crop maintenance device of claim 1, wherein
   said first actuator and said second actuator are variable speed actuators; and,
   said control said first actuator and said second actuator comprises
      set a first desired speed and a first desired direction of motion of said first actuator; and,
      set a second desired speed and a second desired direction of motion of said second actuator.

4. The intelligent crop maintenance device of claim 3, wherein
   said first actuator comprises a first electric motor; and,
   said second actuator comprises a second electric motor.

5. The intelligent crop maintenance device of claim 1, wherein
   said first actuator and said second actuator are variable position actuators; and,
   said control said first actuator and said second actuator comprises
      set a first desired position of said first actuator; and
      set a second desired position of said second actuator.

6. The intelligent crop maintenance device of claim 5, wherein
   said first actuator comprises a first electric motor; and,
   said second actuator comprises a second electric motor.

7. The intelligent crop maintenance device of claim 1, wherein
   said one or more sensors comprise a camera; and
   said sensor data comprises images from said camera.

8. The intelligent crop maintenance device of claim 7, wherein wherein said processor is further configured to analyze said sensor data to determine the current position of said first blade and of said second blade, and wherein said determine said current position of said first blade and of said second blade comprises
   analyze said images to determine a position or orientation of one or more portions of said first blade mount and one or more portions of said second blade mount; and,
   calculate said position of said first blade and of said second blade based on said position or orientation of said one or more portions of said first blade mount and said one or more portions of said second blade mount.

9. The intelligent crop maintenance device of claim 8, wherein
   one or both of said first blade mount and said first actuator comprise a first visual marker;
   one or both of said second blade mount and said second actuator comprise a second visual marker;

said analyze said images to determine a position or orientation of one or more portions of said first blade mount and one or more portions of said second blade mount comprises locate said first visual marker and said second visual marker in said images.

10. The intelligent crop maintenance device of claim 1, wherein
said each row maintenance unit further comprises a housing, rail, or carriage that is coupled to said vehicle;
said first blade, said first blade mount, and said first actuator are coupled to said housing, rail, or carriage with a first coupling that enables rotation of said first blade, said first blade mount, and said first actuator relative to said housing, rail, or carriage around a horizontal axis that is perpendicular to a direction of travel of said vehicle; and,
said second blade, said second blade mount, and second first actuator are coupled to said housing, rail, or carriage with a second coupling that enables rotation of said second blade, said second blade mount, and said second actuator relative to said housing, rail, or carriage around said horizontal axis that is perpendicular to the direction of travel of said vehicle.

11. The intelligent crop maintenance device of claim 10, wherein
when said first blade encounters a first obstacle, said first blade, said first blade mount, and said first actuator rotate relative to said housing, rail, or carriage to lift said first blade relative to said first obstacle; and,
when said second blade encounters a second obstacle, said second blade, said second blade mount, and said second actuator rotate relative to said housing, rail, or carriage to lift said second blade relative to said second obstacle.

12. The intelligent crop maintenance device of claim 1, wherein all shifting side-to-side to account for misalignment between a path of said vehicle and said row of plants is performed dynamically by one or both of said first actuator and said second actuator.

13. The intelligent crop maintenance device of claim 1, wherein modification of a position of said first blade and of a position of said second blade to account for misalignment between a path of said vehicle and said row of plants is performed dynamically by one or both of said first actuator and said second actuator.

14. The intelligent crop maintenance device of claim 1, wherein said each row maintenance unit further comprises
a housing located over said first blade and said second blade, and over one or more of said one or more plants, wherein said housing provides a shade such that housing shades an area under said housing containing said one or more of said one or more plants.

15. The intelligent crop maintenance device of claim 14, wherein said one or more sensors comprise
a camera coupled to an underside of said housing and oriented to capture images of an area of said row of plants below said shade.

16. The intelligent crop maintenance device of claim 1, further comprising:
a vehicle control system coupled to said processor of said each row maintenance unit and coupled to a drive train and a steering system of said vehicle.

17. The intelligent crop maintenance device of claim 16, wherein
said drive train and said steering system are further coupled to an operator control input;
said vehicle control system is configured to guide said vehicle along said row of plants; and,
said operator control input is configured to turn said vehicle and position said vehicle at a subsequent row of plants in said field.

18. The intelligent crop maintenance device of claim 17, wherein
said vehicle control system utilizes said sensor data from said one or more sensors of said one or more row maintenance units to guide said vehicle along said row of plants.

19. An intelligent crop maintenance device with independently controlled blades, comprising:
one or more row maintenance units, each row maintenance unit of said one or more row maintenance units configured to be mounted to a vehicle and to treat a row of plants in a field as said vehicle moves through said field, wherein said each row maintenance unit comprises
a first blade configured to drag along or below a soil surface as said vehicle moves through said field;
a first blade mount coupled to said first blade and said vehicle;
a first actuator configured to actuate said first blade;
a second blade configured to drag along or below said soil surface as said vehicle moves through said field;
a second blade mount coupled to said second blade and said vehicle; and,
a second actuator configured to actuate said second blade;
wherein
said first blade and said second blade are configured to be positioned initially on opposite sides of said row of plants;
one or both of said first blade mount and said first actuator comprise a first visual marker;
one or both of said second blade mount and said second actuator comprise a second visual marker;
a camera configured to capture images;
a processor coupled to said camera, and configured to
analyze said images to determine a location of said first visual marker and a location of said second visual marker in said images;
determine a position or orientation of one or more portions of said first blade mount based on said location of said first visual marker; and
determine a position or orientation of one or more portions of said second blade mount based on said location of said second visual marker.

\* \* \* \* \*